(12) United States Patent
Chakra et al.

(10) Patent No.: US 10,089,001 B2
(45) Date of Patent: Oct. 2, 2018

(54) OPERATING SYSTEM LEVEL MANAGEMENT OF APPLICATION DISPLAY

(71) Applicant: International Business Machines Corporation, Armonk, NY (US)

(72) Inventors: Al Chakra, Apex, NC (US); Saurabh Gupta, Burlington, MA (US); James Y. McVea, Jr., Chapel Hill, NC (US); Nancy A. Schipon, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 14/833,969

(22) Filed: Aug. 24, 2015

(65) Prior Publication Data
US 2017/0060377 A1    Mar. 2, 2017

(51) Int. Cl.
*G06F 3/048*  (2013.01)
*G06F 3/0488* (2013.01)
*G06F 3/0481* (2013.01)
*G06F 9/451*  (2018.01)

(52) U.S. Cl.
CPC .......... *G06F 3/0488* (2013.01); *G06F 3/0481* (2013.01); *G06F 9/451* (2018.02)

(58) Field of Classification Search
CPC combination set(s) only.
See application file for complete search history.

(56) References Cited

U.S. PATENT DOCUMENTS

| | | | |
|---|---|---|---|
| 8,171,399 B2 | 5/2012 | Coppedge, III et al. | |
| 8,312,365 B2 | 11/2012 | Goel et al. | |
| 9,477,394 B2 * | 10/2016 | Sirpal | |
| 9,639,199 B2 * | 5/2017 | Jung | G06F 3/0416 |
| 2007/0180400 A1 * | 8/2007 | Zotov | G06F 3/04883 715/788 |
| 2011/0069018 A1 * | 3/2011 | Atkins | G06F 3/0416 345/173 |
| 2011/0072349 A1 | 3/2011 | Catanese et al. | |
| 2011/0193795 A1 * | 8/2011 | Seidman | G01C 21/3664 345/173 |

(Continued)

FOREIGN PATENT DOCUMENTS

WO    2013100974 A1    7/2013

OTHER PUBLICATIONS

Desu, Timi, "Creating see-through graphics for window decals in Photoshop", Graphic Design, StackExchange, Asked on Sep. 5, 2013, Printed on: Jul. 7, 2015, pp. 1-2, <http://graphicdesign.stackexchange.com/questions/21027/creating-see-through-graphics-for-window-decals-in-photoshop>.

(Continued)

*Primary Examiner* — Hien Luongvan Duong
(74) *Attorney, Agent, or Firm* — Christopher K. McLane; Alexander G. Jochym

(57) ABSTRACT

In an approach to managing a display of an application by an operating system, one or more computer processors launch a pointing mechanism by an operating system. The one or more computer processors receive an application area, where the application area is defined by movement of the pointing mechanism on a display device. The one or more computer processors receive a launch of one or more applications. The one or more computer processors display the one or more applications in the application area.

16 Claims, 6 Drawing Sheets

(56) References Cited

U.S. PATENT DOCUMENTS

| | | | | |
|---|---|---|---|---|
| 2012/0218202 A1* | 8/2012 | Sirpal | ............... | G06F 1/1616 |
| | | | | 345/173 |
| 2012/0225694 A1* | 9/2012 | Sirpal | ............... | G06F 1/1616 |
| | | | | 455/566 |
| 2013/0222321 A1* | 8/2013 | Buening | ............ | G06F 3/041 |
| | | | | 345/173 |
| 2013/0298054 A1* | 11/2013 | Nakazawa | ......... | G06F 3/04883 |
| | | | | 715/765 |
| 2013/0346912 A1* | 12/2013 | Buening | ........... | G06F 3/0488 |
| | | | | 715/783 |
| 2014/0250406 A1* | 9/2014 | Seo | .................. | G06F 3/0488 |
| | | | | 715/781 |

OTHER PUBLICATIONS

Gavy, "iOS 7 See Through Window", Stack Overflow, Stack Exchange, Asked on Dec. 25, 2013, Printed on: Jul. 7, 2015, pp. 1-2, <http://stackoverflow.com/questions/20768269/ios-7-see-through-window>.

M, Matt, "Widget Notes—Whiteboard", Android Apps on Google Play, Nov. 25, 2012, Printed on: Jul. 7, 2015, pp. 1-5, <https://play.google.com/store/apps/details?id=com.mattm.whiteboard>.

Mistry, Rahul, "17 Experimental Examples of Using HTML5 Canvas", Design Instruct, Jul. 17, 2013, Printed on: Jul. 7, 2015, pp. 1-12, <http://designinstruct.com/web-design/examples-html5-canvas/>.

Scott, "New plugin: "Widget Anywhere" [updated!]", Question 2 Answer Q&A, Asked on May 16, 2012, Printed on: Jul. 7, 2015, pp. 1-6, <http://www.question2answer.org/qa/15066/new-plugin-widget-anywhere-updated>.

"CSS Layout—The Position Property", w3schools, Printed on: Jul. 7, 2015, pp. 1-7, <http://www.w3schools.com/css/css_positioning.asp>.

"Method and Process for predefining and leveraging display sensitive window arrangements", IP.com Prior Art Database Technical Disclosure, IP.com No. IPCOM000211123D, IP.com Electronic Publication: Sep. 21, 2011, pp. 1-4.

"Whiteboards for distributed collaboration", innoSupport, Printed on: Jul. 7, 2015, pp. 1-3, <http://www.innosupport.net/index.php?id=95>.

"Whiteboard Type User Interface", IP.com Prior Art Database Technical Disclosure, IP.com No. IPCOM000237953D, IP.com Electronic Publication: Jul. 23, 2014, pp. 1-4.

* cited by examiner

OPERATING SYSTEM LEVEL MANAGEMENT OF APPLICATION DISPLAY

BACKGROUND OF THE INVENTION

The present invention relates generally to the field of operating systems, and more particularly to an operating system level manager for the display of applications.

Viewing information on a display device screen, whether on a conventional desktop computer, a laptop computer, a smart phone, a tablet, or another device type that runs an operating system is a common activity that users often perform multiple times per day. In general, the user uses the screen to view content in an application from a source and then uses different features to view more information than can be captured on the display device screen at one time. The features can vary from using back/forward buttons or page up/down buttons, swapping between tabs to view more information in the same application, or swapping between application windows, or tiles, to view information from multiple applications. Some applications may allow more information to be captured with the use of frames.

SUMMARY

Embodiments of the present invention disclose a method, a computer program product, and a system for managing a display of an application by an operating system. The method may include one or more computer processors launching a pointing mechanism by an operating system. The one or more computer processors receive an application area, wherein the application area is defined by movement of the pointing mechanism on a display device. The one or more computer processors receive a launch of one or more applications. The one or more computer processors display the one or more applications in the application area.

DETAILED DESCRIPTION

Typically, in modern window-based operating systems, a user can run multiple applications simultaneously in separate windows or tiles. The application windows can either be loaded one on top of another, such that the top most application is the only visible window, or the windows can be arranged on the screen side by side. To arrange the windows on the screen, the user opens an application, waits for the application to load, then uses resize handles on each edge or corner of the window to create the desired size. Then the user can use the title bar of the window to place the window in a desired location on the screen. The user can repeat this process to display additional applications. In each scenario, the resulting shape of the window is rectangular, and, for the most part, the application is displayed in its entirety. Embodiments of the present invention recognize that efficiency may be gained by utilizing an operating system that displays applications on a screen where the screen may act as a canvas and application areas of varying sizes and shapes are added or deleted from the canvas via a wiping action. Implementation of embodiments of the invention may take a variety of forms, and exemplary implementation details are discussed subsequently with reference to the Figures.

Figure 1:
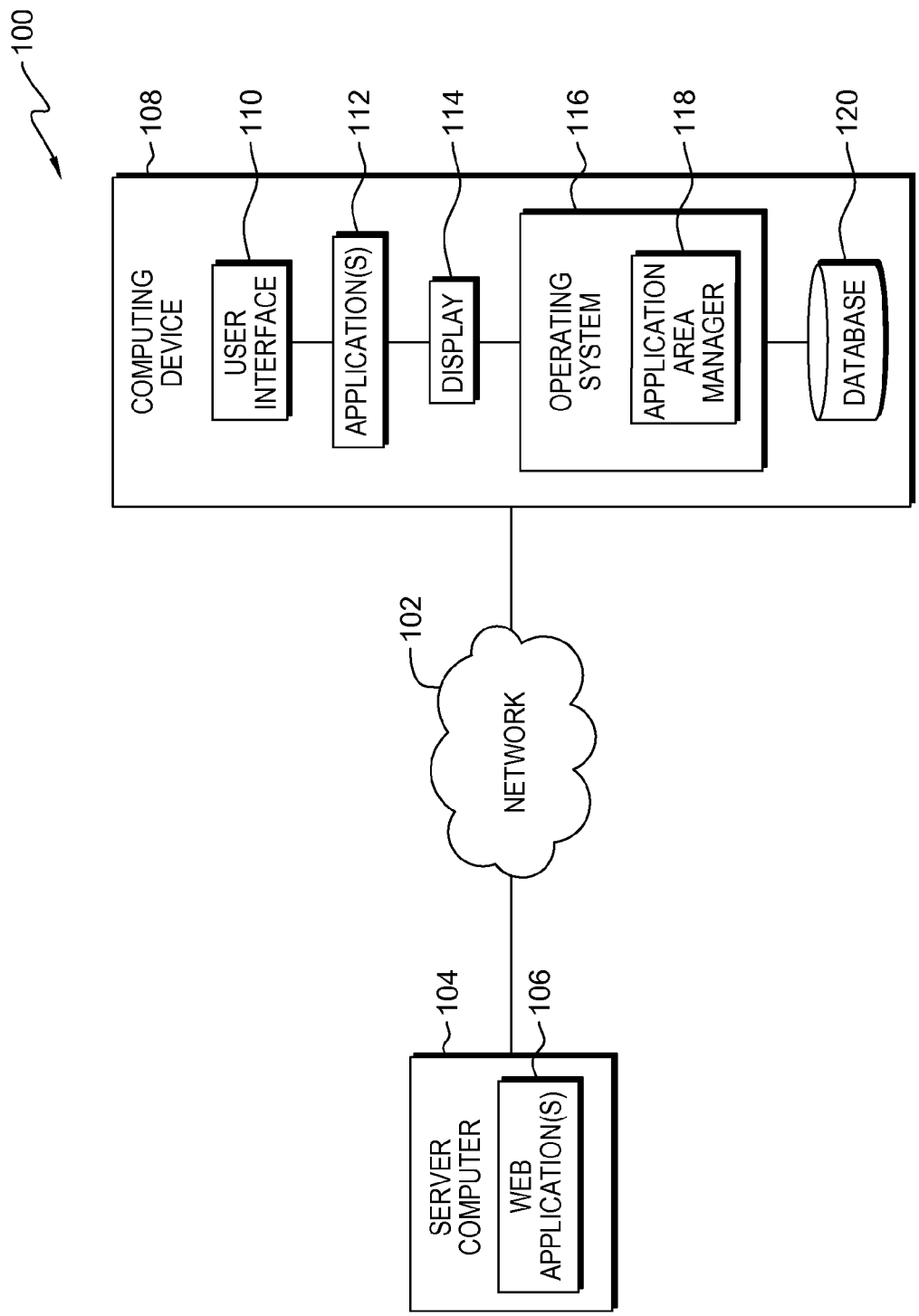
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and computing device 108, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 104, computing device 108, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with computing device 108 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes web application(s) 106.

Web application(s) 106 is one or more of a plurality of computer programs that run in a web browser. Web application(s) 106 is created in a browser-supported programming language and relies on a web browser (not shown) to render the one or more applications.

Computing device 108 can be a laptop computer, a tablet computer, a smart phone, or any programmable electronic device capable of communicating with various components and devices within distributed data processing environment 100, via network 102. Computing device 108 can be a wearable computer. Wearable computers are miniature electronic devices that may be worn by the bearer under, with or on top of clothing, as well as in glasses, hats, or other accessories. Wearable computers are especially useful for applications that require more complex computational support than just hardware coded logics. In general, computing device 108 represents any programmable electronic device or combination of programmable electronic devices capable of executing machine readable program instructions and communicating with other computing devices (not shown) within distributed data processing environment 100 via a network, such as network 102. Computing device 108 includes user interface 110, application(s) 112, display 114, operating system 116, and database 120.

User interface 110 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 110 may also be mobile application software that provides an interface between a user of computing device 108 and server computer 104. User interface 110 provides an interface for the user of computing device 108 to interact with operating system 116 for customizing the display of applications, such as web application(s) 106 and application(s) 112.

Application(s) 112 is one or more of a plurality of computer programs designed to permit a user to perform a group of coordinated functions, tasks, or activities. Examples of types of applications may include accounting software, media players, and office suites. Many application programs deal principally with documents. Application(s) 112 may also be one or more of a plurality of mobile application software, i.e., apps, which are computer programs typically designed to run on smart phones, tablet computers and other mobile devices.

Display 114 is a device that provides a mechanism to display data to a user and may be, for example, a computer monitor. Display 114 can also function as a touchscreen, such as a display of a tablet computer or a smart phone.

Operating system 116 is software that manages computer hardware and software resources of computing device 108 and provides common services for computer programs. Operating system 116 includes application area manager 118.

Application area manager 118 creates areas on display 114 for displaying one or more of a plurality of applications, such as application(s) 112. The application areas may be of any shape and/or size, as defined by the user. Application area manager 118 provides the user, via user interface 110, with a pointing mechanism for defining the shape and size of an application area on display 114. Application area manager 118 depicts display 114 as a canvas on which the user can arrange application(s) 112 in an efficient manner to best utilize the full area of display 114. Application area manager 118 may also provide the user with the ability to stack application areas and cycle, or toggle, through a stack of applications. Application area manager 118 may also provide the user with the ability to associate two or more applications such that when the user utilizes a first application, an associated one or more applications appear in the foreground of display 114 with the first application. Application area manager 118 is depicted and described in further detail with respect to FIG. 2.

Database 120 resides on computing device 108. In another embodiment, database 120 can reside elsewhere in distributed data processing environment 100, provided that application area manager 118 has access to database 120. A database is an organized collection of data. Database 120 can be implemented with any type of storage device capable of storing data and configuration files that can be accessed and utilized by computing device 108, such as a database server, a hard disk drive, or a flash memory. Database 120 stores user preferences for displaying applications via application area manager 118.

Figure 2:
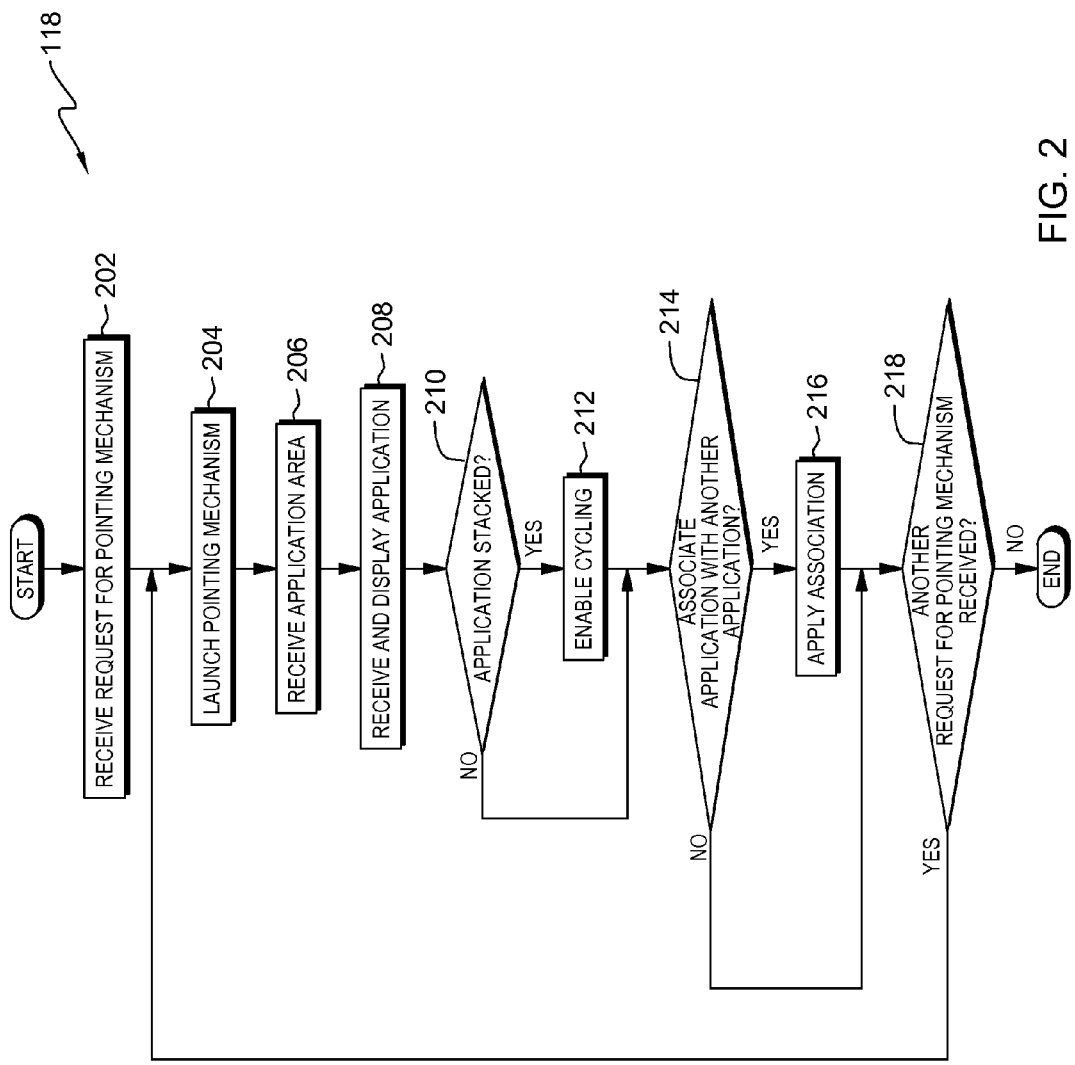
FIG. 2 is a flowchart depicting operational steps of an application area manager, on a computing device within the distributed data processing environment of FIG. 1, for displaying application areas, in accordance with an embodiment of the present invention.

FIG. 2 is a flowchart depicting operational steps of application area manager 118, on computing device 108 within distributed data processing environment 100 of FIG. 1, for displaying application areas, in accordance with an embodiment of the present invention.

Application area manager 118 receives a request for a pointing mechanism from the user (step 202). In a preferred embodiment, the pointing mechanism may be a wipe tool that resembles a whiteboard eraser, and the user can utilize a wiping action with the wipe tool, as would be done on a whiteboard, to define an application area. In the embodiment, varying sizes of the wipe tool may be available to enable efficient wiping of an area on display 114, depending on whether the user wants to create a small or large application area, or a size in between small and large. In an embodiment, the size of the wipe tool may be increased or decreased continuously to create a custom size. The request for the pointing mechanism may include an indication of the desired size. In an embodiment where display 114 is a touchscreen, the size of the pointing mechanism may be dynamic and the user may determine the size by "pinching" or "spreading" the pointing mechanism on the screen with the user's fingers. In another embodiment, the pointing mechanism may be a cursor that the user can direct to outline an application area. The request for a pointing mechanism includes information regarding the location for the starting point of the pointing mechanism. Application area manager 118 receives the request for the pointing mechanism via user interface 110. In one embodiment, user interface 110 provides the user with a dropdown box from which to request the pointing mechanism. In another embodiment, user interface 110 may provide the user with an icon to click or tap to request the pointing mechanism. In yet another embodiment, user interface 110 may receive a gesture from the user, such as a hand wave, to enable the user to request the pointing mechanism. In a further embodiment, the request for the pointing mechanism may be included as part of the startup procedure of operating system 116. A user may define preferences, via user interface 110, for the style, size, and location of the pointing mechanism which are stored in database 120.

Application area manager 118 launches pointing mechanism (step 204). Responsive to receiving the request for a pointing mechanism, whether the request is user-initiated or as part of the startup procedure, application area manager 118 launches the pointing mechanism, via user interface 110.

Application area manager 118 receives an application area (step 206). The user utilizes the pointing mechanism to define an application area. In an embodiment where display 114 is a standard computer monitor, the user may select and utilize the pointing mechanism with a mouse click. In an embodiment where display 114 is a touchscreen, the user may select and utilize the pointing mechanism with a finger tap. In yet another embodiment, the user may select and utilize the pointing mechanism with a gesture, such as a hand wave. In the preferred embodiment, the user selects the wipe tool and wipes an area of the display screen to the desired size and shape. The size may be any subset of the size of the display screen. The shape may be regular or irregular. In one embodiment, a user may define preferences for size and shape of application areas, via user interface 110, and store them in database 120. In an embodiment, receiving an application area includes application area manager 118 opening a connection to an open placeholder waiting for one or more applications, for example, web application(s) 106 or application(s) 112. The connection, acting as an internal application programming interface (API), creates a proxy or a tunnel between the application area and the one or more applications that application area manager 118 may display in the application area.

Application area manager 118 receives and displays an application (step 208). With the application area defined, the user can launch an application, such as web application(s) 106 or application(s) 112. Application area manager 118 receives the application launch and displays the application in the application area. In one embodiment, application area manager 118 receives the application when the user chooses the application from a popup menu associated with the application area. In another embodiment, application area manager 118 receives the application when the user utilizes a "drag and drop" process to place the application, for example an image file, in the application area from the user's desktop or file listing. In yet another embodiment, application area manager 118 may receive the application when the user right clicks on the application area for a context menu. For example, a user may right click on an application area and view applications running in the background. When a user launches web application(s) 106 or application(s) 112, the user can highlight, via user interface 110, a portion of the displayed application for application area manager 118 to display in the application area. For example, a user may view a weather-related website and highlight just the portion of the page that shows the current temperature. Application area manager 118 displays the temperature portion of the page in the application area.

Application area manager 118 determines whether the application is stacked on another application (decision block 210). The user can launch a new application on top of an existing application in a single application area. Application area manager 118 enables stacking of one or more applications in a wiped area such that the x and y coordinates of each application on the screen, indicating the height and width of each application area, may be the same or vary amongst the stacked applications within the one wiped area, and each application area has a different z coordinate, i.e., a different height in the stack. In an embodiment, when a user wipes a portion of an application area, application area manager 118 creates a sub-canvas available for launch and display of an additional application. In the embodiment, a hash table, i.e., a data structure used to implement an associative array, tracks the layers of applications in the stack. When one of the stacked applications is closed, application area manager 118 recalls the one or more layers underneath.

If application area manager 118 determines that the application is stacked on another application ("yes" branch, decision block 210), then application area manager 118 enables cycling (step 212). When applications are stacked, application area manager 118 enables the user to cycle through the applications that reside in the stack. In one embodiment, the user cycles through the stack via a user action, such as clicking or tapping on an icon to reveal the next (or previous) application in the stack. In another embodiment, the user may cycle through the stacked applications using a keyboard shortcut to reveal the next (or previous) application in the stack. Each click or keypress to trigger a rotation action changes the z coordinate of each stacked application such that application area manager 118 brings the next (or previous) application to the forefront of the application area.

Responsive to enabling cycling, or if application area manager 118 determines that the application is not stacked on another application ("no" branch, decision block 210), then application area manager 118 determines whether the user wants to associate the application with another application (decision block 214). A user may associate two or more applications in different application areas such that when the user selects a first application in a first stack of applications, the one or more associated applications come to the forefront of the screen or to the top of a second stack of applications. By enabling a user to group applications together, application area manager 118 simplifies navigation and the presence of multiple applications. For example, if the user associates a headline news widget with a browser application, when the user selects the browser application, application area manager 118 causes the headline news widget to come to the forefront of the screen or to the top of a stack of applications. In one embodiment, a user may associate two or more applications via a right click menu. The user may choose an option of "associate with" followed by clicking on an application in a different application area. In another embodiment, a user may associate two or more applications by dragging one application into the vicinity of another via a mouse click or finger touch. If application area manager 118 determines that the user does want to associate the application with another application ("yes" branch, decision block 214), then application area manager 118 applies an association (step 216).

Responsive to applying an association, or if application area manager 118 determines that the user does not want to associate the application with another application ("no" branch, decision block 214), then application area manager 118 determines whether another request for a pointing mechanism is received (decision block 218). If application area manager 118 determines that another request for a pointing mechanism is received ("yes" branch, decision block 218), then application area manager 118 returns to step 204 to launch the pointing mechanism. If application area manager 118 determines that another request for a pointing mechanism is not received ("no" branch, decision block 218), then application area manager 118 completes execution until another request for a pointing mechanism is received.

Figure 3A:
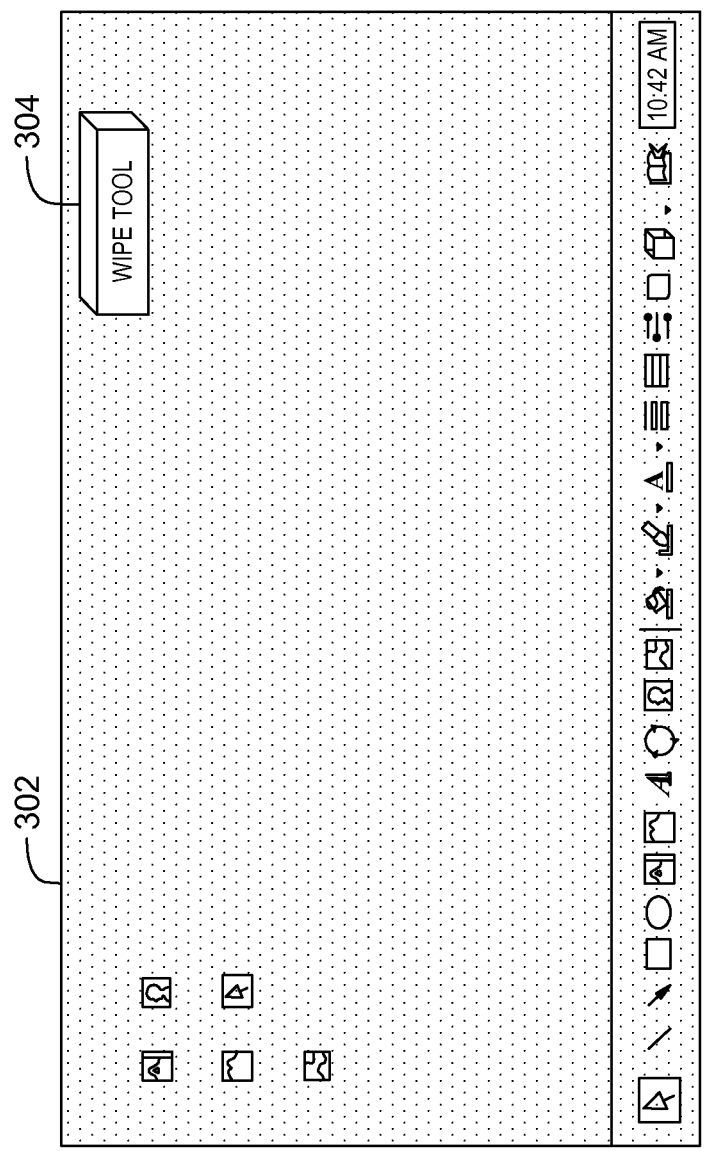
FIGS. 3A, 3B, and 3C illustrate an example of the application area manager, on the computing device within the distributed data processing environment of FIG. 1, in accordance with an embodiment of the present invention.
Figure 3B:
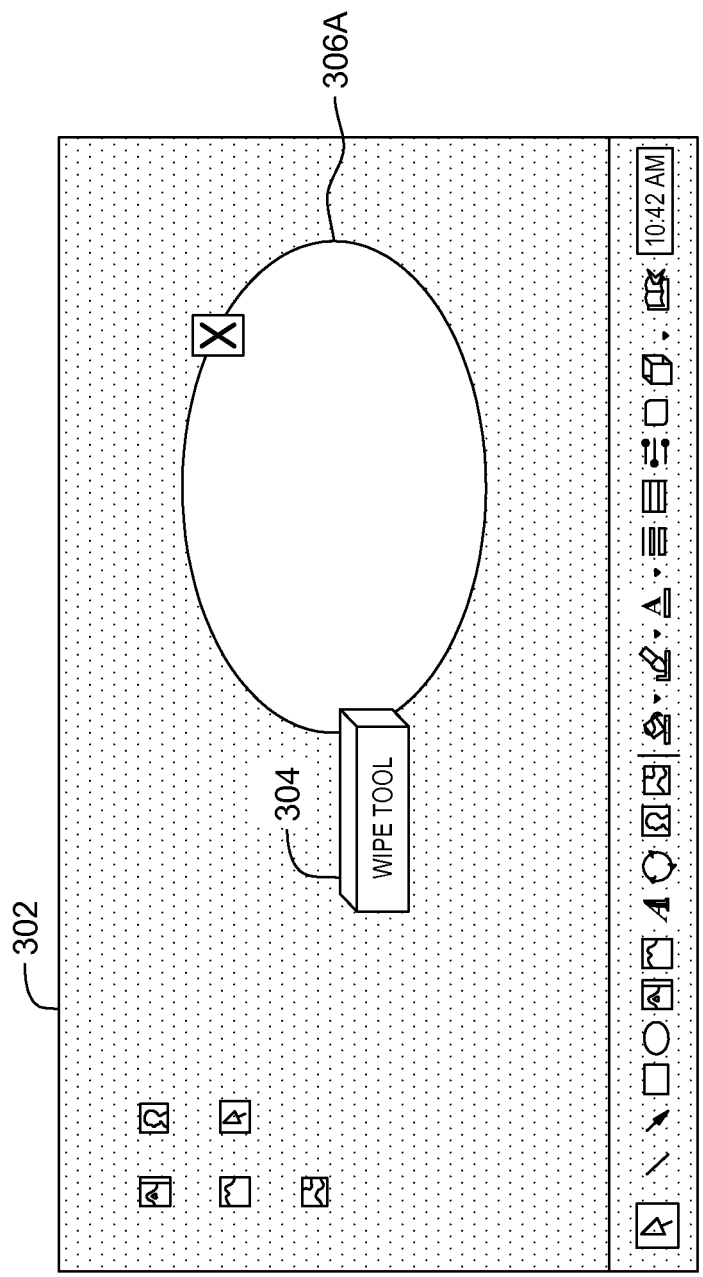
Figure 3C:
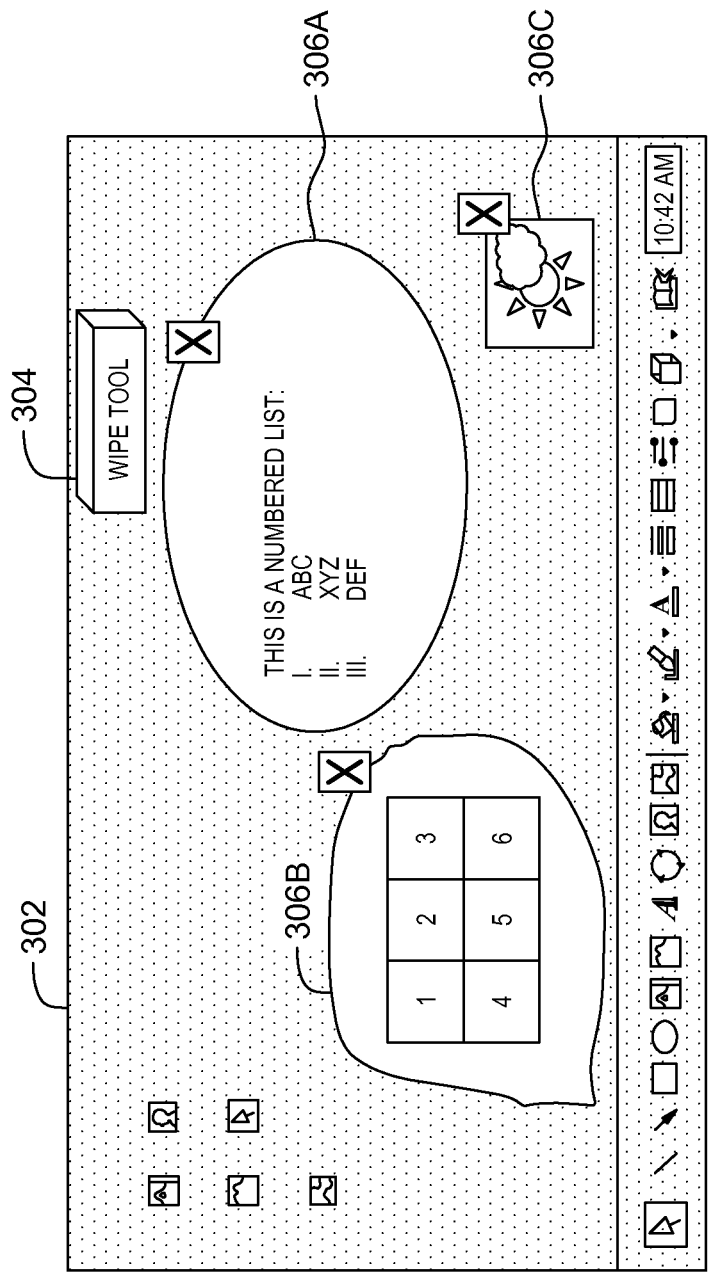

FIGS. 3A, 3B, and 3C illustrate an example of application area manager 118, on computing device 108 within distributed data processing environment 100 of FIG. 1, in accordance with an embodiment of the present invention.

FIG. 3A depicts desktop 302 as it may appear on display 114. Desktop 302 includes several icons and a clock. In the depicted embodiment, wipe tool 304 is a pointing mechanism associated with application area manager 118. The icon for wipe tool 304 is available on desktop 302 for use by the user to define an application area.

FIG. 3B depicts wipe tool 304 creating application area 306A on desktop 302. In the example, application area 306A is an oval shape and covers approximately twenty percent of the screen of display 114. In the embodiment, the user moves wipe tool 304 by a left click and hold of a mouse button (not shown). Application area 306A is currently empty because the user has not yet launched an application. In the depicted embodiment, application area 306A includes an "X" that represents a close box that a user can tap or click to close the application area. In another embodiment, an application area may include buttons for minimizing, maximizing, and/or resizing the area. In a further embodiment, the user may use the wiping tool to delete an open application area.

FIG. 3C depicts three different application areas on desktop 302. In addition to application area 306A, the user has created application area 306B which is a freeform shape and covers approximately fifteen percent of the screen of display 114. The user has also created application area 306C which is rectangular and covers approximately five percent of the screen of display 114. As the example depicts, application areas can be any shape and size that the user desires. Within application area 306A, the user has launched a word processing application, which may be one of application(s) 112. Within application area 306B, the user has launched a spreadsheet application, which may also be one of application(s) 112. Within application area 306C, the user has launched a portion of a weather website, which may be one of web application(s) 106. The user has returned wipe tool 304 to its original position on desktop 302. It should be appreciated that embodiments of the present invention are not limited to three application areas, as depicted in FIG. 3C, and that any number of application areas may be open simultaneously.

Figure 4:
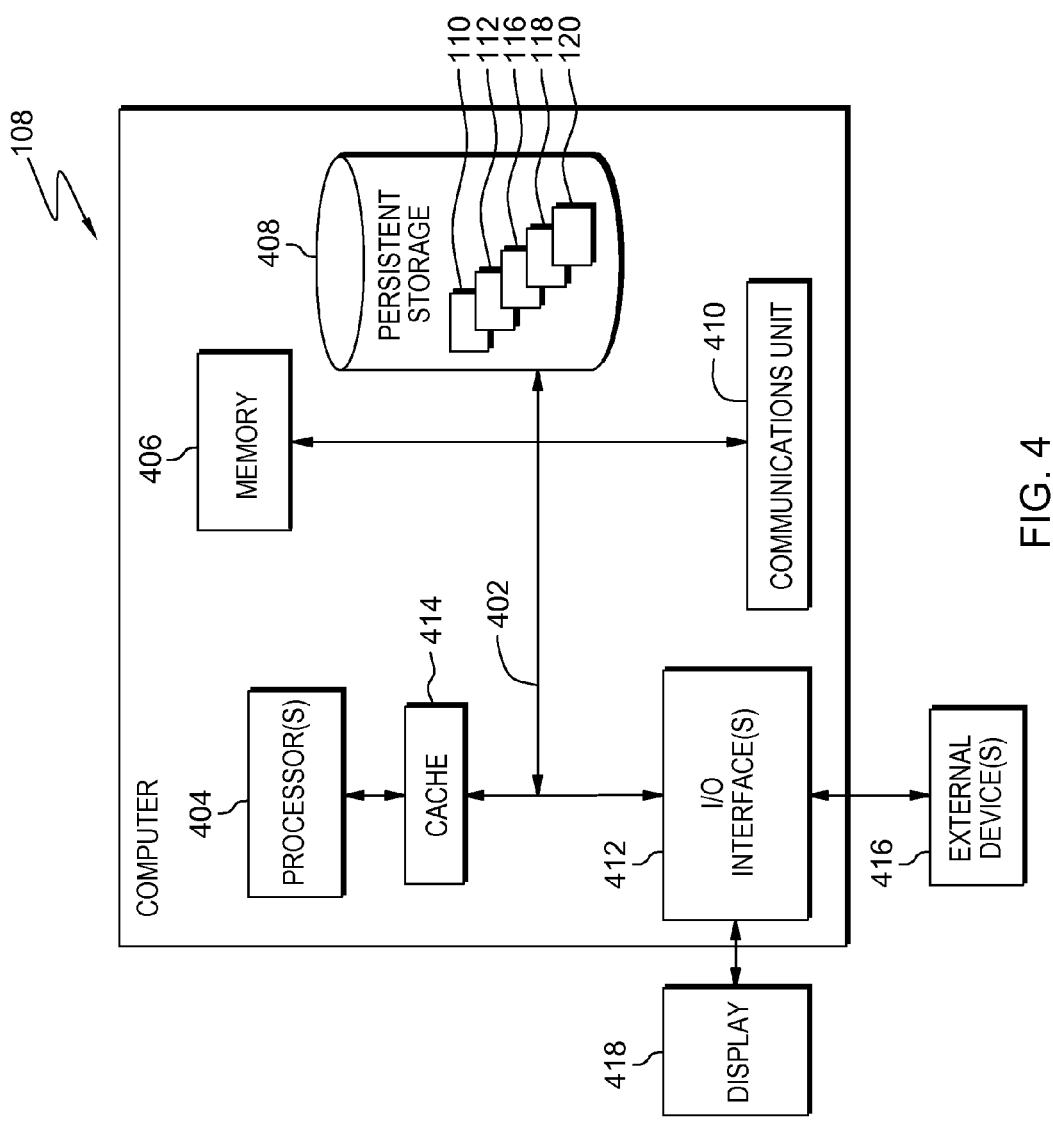
FIG. 4 depicts a block diagram of components of the computing device executing the application area manager within the distributed data processing environment of FIG. 1, in accordance with an embodiment of the present invention.

FIG. 4 depicts a block diagram of components of computing device 108 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computing device 108 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., user interface 110, application(s) 112, operating system 116, application area manager 118, and database 120 are stored in persistent storage 408 for execution and/or access by one or more of the respective processor(s) 404 of computing device 108 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of server computer 104. In these examples, communications unit 410 includes one or more network interface cards. Communications unit 410 may provide communications through the use of either or both physical and wireless communications links. User interface 110, application(s) 112, operating system 116, application area manager 118, and database 120 may be downloaded to persistent storage 408 of computing device 108 through communications unit 410.

I/O interface(s) 412 allows for input and output of data with other devices that may be connected to computing device 108. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., user interface 110, application(s) 112, operating system 116, application area manager 118, and database 120 on computing device 108, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer. In embodiments of the present invention, display 418 can function as display is reference with respect to display 114.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing a display of an application by an operating system, the method comprising:

launching, by one or more computer processors, a pointing mechanism by an operating system on a display device, wherein the pointing mechanism resembles a whiteboard eraser;

receiving, by the one or more computer processors, a size and a shape of the pointing mechanism;

receiving, by the one or more computer processors, a size and a shape of an application area, wherein the size and the shape of the application area is created by movement of the pointing mechanism on a display device, wherein the movement of the pointing mechanism is a wiping action to define the application area;

receiving, by the one or more computer processors, a launch of one or more applications; and displaying, by the one or more computer processors, the one or more applications in the application area.

2. The method of claim 1, further comprising:

determining, by the one or more computer processors, whether a display of one or more applications is stacked on top of a display of one or more additional applications within one application area; and responsive to determining a display of one or more applications is stacked on top of a display of one or more additional applications within one application area, enabling, by the one or more computer processors, cycling through the display of stacked applications, wherein cycling includes displaying each application in an order that the one or more applications reside in a stack in response to a user action.

3. The method of claim 1, further comprising associating, by the one or more computer processors, a first application in a first application area with a second application in a second application area, wherein displaying the first application causes the second application to be displayed.

4. The method of claim 1, further comprising, prior to launching the pointing mechanism by the operating system, receiving, by one or more computer processors, a request for a pointing mechanism on a display device from a user.

5. The method of claim 4, wherein receiving a request for the pointing mechanism is included as part of a startup procedure of the operating system.

6. The method of claim 4, wherein receiving a request for the pointing mechanism includes the operating system receiving a gesture from the user.

7. The method of claim 1, wherein the shape of the application area includes at least an oval.

8. The method of claim 1, wherein the shape of the application area includes at least a freeform shape.

9. A computer program product for managing a display of an application by an operating system, the computer program product comprising:

one or more computer readable storage device and program instructions stored on the one or more computer readable storage device, the stored program instructions comprising:

program instructions to launch a pointing mechanism by an operating system on a display device, wherein the pointing mechanism resembles a whiteboard eraser;

program instructions to receive a size and a shape of the pointing mechanism;

program instructions to receive a size and a shape of an application area, wherein the size and the shape of the application area is created by movement of the pointing mechanism on a display device, wherein the movement of the pointing mechanism is a wiping action to define the application area;

program instructions to receive a launch of one or more applications; and program instructions to display the one or more applications in the application area.

10. The computer program product of claim 9, the stored program instructions further comprising:

program instructions to determine whether a display of one or more applications is stacked on top of a display of one or more additional applications within one application area; and responsive to determining a display of one or more applications is stacked on top of a display of one or more additional applications within one application area, program instructions to enable cycling through the display of stacked applications, wherein cycling includes displaying each application in an order that the one or more applications reside in a stack in response to a user action.

11. The computer program product of claim 9, the stored program instructions further comprising program instructions to associate a first application in a first application area with a second application in a second application area, wherein displaying the first application causes the second application to be displayed.

12. The computer program product of claim 9, the stored program instructions further comprising, prior to launching the pointing mechanism by the operating system, program instructions to receive a request for a pointing mechanism on a display of a device from a user.

13. A computer system for managing a display of an application by an operating system, the computer system comprising:

one or more computer processors;

one or more computer readable storage device;

program instructions stored on the one or more computer readable storage device for execution by at least one of the one or more computer processors, the stored program instructions comprising:

program instructions to launch a pointing mechanism by an operating system on a display device, wherein the pointing mechanism resembles a whiteboard eraser;

program instructions to receive a size and a shape of the pointing mechanism;

program instructions to receive a size and a shape of an application area, wherein the size and the shape of the application area is created by movement of the pointing mechanism on a display device, wherein the movement of the pointing mechanism is a wiping action to define the application area;

program instructions to receive a launch of one or more applications; and program instructions to display the one or more applications in the application area.

14. The computer system of claim 13, the stored program instructions further comprising:

program instructions to determine whether a display of one or more applications is stacked on top of a display of one or more additional applications within one application area; and responsive to determining a display of one or more applications is stacked on top of a display of one or more additional applications within one application area, program instructions to enable cycling through the display of stacked applications, wherein cycling includes displaying each application in an order that the one or more applications reside in a stack in response to a user action.

15. The computer system of claim 13, the stored program instructions further comprising program instructions to associate a first application in a first application area with a second application in a second application area, wherein displaying the first application causes the second application to be displayed.

16. The computer system of claim 13, the stored program instructions further comprising, prior to launching the pointing mechanism by the operating system, program instructions to receive a request for a pointing mechanism on a display of a device from a user.

* * * * *